No. 730,358. PATENTED JUNE 9, 1903.
J. B. FLADBY.
HARNESS PEG.
APPLICATION FILED FEB. 12, 1903.
NO MODEL.
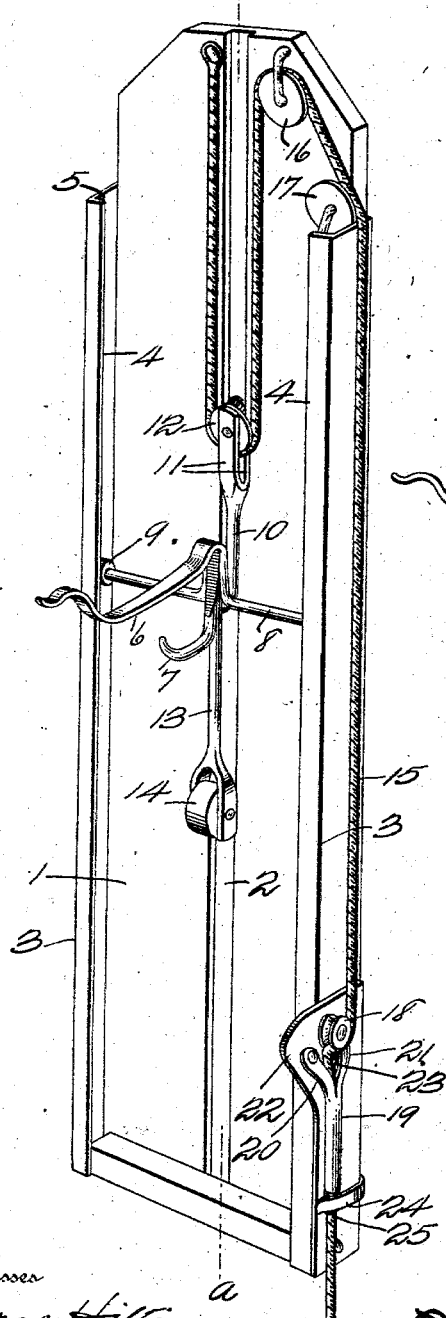
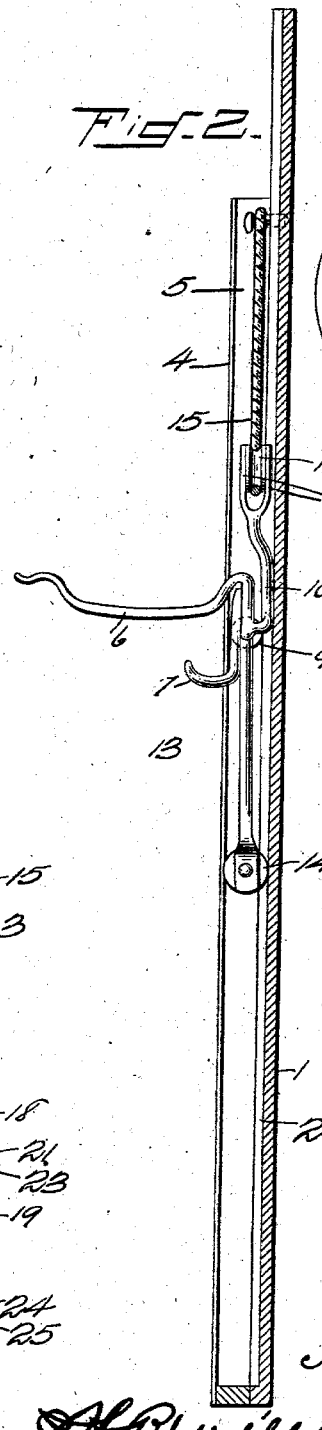
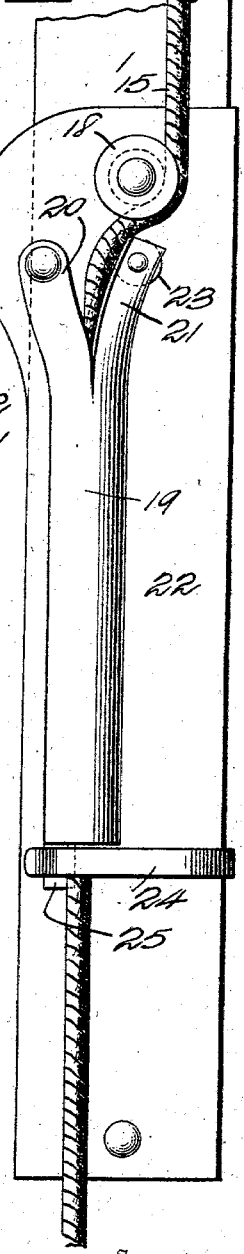
Witnesses
George Hilton
L. Hilton
Inventor
J. B. Fladby,
By H. B. Wilson
Attorney
THE NORRIS PETERS CO., PHOTO-LITHO., WASHINGTON, D. C.

No. 730,358. Patented June 9, 1903.

UNITED STATES PATENT OFFICE.

JOHN B. FLADBY, OF RUTLAND, NORTH DAKOTA.

HARNESS-PEG.

SPECIFICATION forming part of Letters Patent No. 730,358, dated June 9, 1903.

Application filed February 12, 1903. Serial No. 143,077. (No model.)

*To all whom it may concern:*

Be it known that I, JOHN B. FLADBY, a citizen of the United States, residing at Rutland, in the county of Sargent and State of North Dakota, have invented certain new and useful Improvements in Harness-Pegs; and I do declare the following to be a full, clear, and exact description of the invention, such as will enable others skilled in the art to which it appertains to make and use the same.

My invention is an improved harness-peg, adapted to be raised and lowered, as may be desired, and to be secured at any desired elevation; and it consists in the construction and combination of devices hereinafter described and claimed.

In the accompanying drawings, Figure 1 is a perspective view of a harness-peg embodying my improvements. Fig. 2 is a detail sectional view of the same, taken on the plane indicated by the line *a a* of Fig. 1. Fig. 3 is a detail view of the means for locking the peg elevating and lowering cord.

In the embodiment of my invention here shown I provide a vertically-disposed guide 1, which is provided on its outer side with a centrally-disposed groove 2, forming a race, and is provided at its sides with outwardly-extending flange-plates 3, having their outer portions inturned to form the overhanging flanges 4, and thereby forming guide grooves or races 5 at the sides of the guide 1.

The harness-peg is here shown as provided with two hooks 6 7, one below the other and one adapted to support the collar and the other the remainder of the harness. The peg is further provided with a transversely-disposed shaft 8, having rollers 9 mounted on its ends, which rollers operate in the guide-grooves 5 at the sides of the guide 1. An arm 10 extends upwardly from the peg, engages and is disposed to travel in the race or groove 2, and has its outer upper portion outturned to dispose it beyond the plane of the said guide-groove 2 and is forked, as at 11, and provided with a pulley 12. An arm 13 extends downwardly from the peg, is formed at its lower end and provided with a guide-roller 14, which operates in the groove or race 2.

An elevating and lowering cord 15 has one end attached to the upper portion of the guide 1, passes downwardly therefrom, engages the under side of pulley 12, then passes upwardly over a direction-sheave 16 at the upper end of the guide 1, then outwardly and downwardly to engage the outer side of a direction-sheave 17, then engages one side of a pulley 18, which is on one side of the guide 1 at a suitable distance from its lower end, and its free end is passed through a tubular lever 19, which is provided at its upper end with the laterally-extended arm 20 and a pair of oppositely-extended fork-arms 21. The arm 20 is pivoted on a plate 22, which is secured on one of the side flange-plates of the guide 1, the pulley 18 being also mounted on said plate 22. A cam-roller 23 is carried by the forked arms of the tubular lever and is engaged by the cord 15. Hence by turning the tubular lever in one direction on its pivot the said cord may be securely clamped between the pulley 18 and the cam-roller to support the peg at any desired elevation, it being understood that the peg may be raised and lowered by means of the cord and the pulleys hereinbefore described. The tubular lever is provided at its lower end with a lock-stud 23, which may be engaged by a spring-catch 24 and when thus engaged coacts with the said spring-catch to lock the tubular lever in such position as to securely clamp the peg-operating cord, and thereby support the peg at any desired vertical adjustment.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. In combination with an upright guide, having side races and an intermediate race, a vertically-movable harness-peg having upwardly and downwardly extending arms, to travel in the intermediate race, and a transversely-disposed element engaging the side races, and a tackle to raise and lower said peg, and means to secure the tackle and thereby secure the peg at any desired elevation, substantially as described.

2. In combination with an upright guide having side recesses and an intermediate race, a harness-peg having upwardly and downwardly extending arms, the former provided with a sheave 12, and the latter with a roller 14 operating in the intermediate race, and a transversely-disposed shaft having rollers engaging the side races, an elevating-cord attached to the guide and engaged with the sheave 12, and a direction-sheave 16 on said guide also engaged by said cord, and means to secure the cord, substantially as described.

In testimony whereof I have hereunto set my hand in presence of two subscribing witnesses.

JOHN B. FLADBY.

Witnesses:
O. WEDIN,
ED. BENTSON.